(12) United States Patent
Hilldore et al.

(10) Patent No.: US 11,027,657 B2
(45) Date of Patent: Jun. 8, 2021

(54) SYSTEM FOR REARVIEW CAMERA AS A GLARE SENSOR

(71) Applicant: GENTEX CORPORATION, Zeeland, MI (US)

(72) Inventors: Benjamin B. Hilldore, Holland, MI (US); Barry K. Nelson, Howard City, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 16/684,799

(22) Filed: Nov. 15, 2019

(65) Prior Publication Data
US 2020/0164807 A1 May 28, 2020

Related U.S. Application Data

(60) Provisional application No. 62/771,312, filed on Nov. 26, 2018.

(51) Int. Cl.
*B60R 1/08* (2006.01)
*H04N 5/225* (2006.01)
(Continued)

(52) U.S. Cl.
CPC ............ *B60R 1/08* (2013.01); *G02B 5/08* (2013.01); *H04N 5/2251* (2013.01); *G08G 1/167* (2013.01); *H04N 7/181* (2013.01)

(58) Field of Classification Search
None
See application file for complete search history.

(56) References Cited

U.S. PATENT DOCUMENTS 5,483,348 A * 1/1996 Komatsu ............... G03F 9/70
250/548
5,550,677 A * 8/1996 Schofield ............. B60N 2/002
348/E7.086
(Continued)

FOREIGN PATENT DOCUMENTS

DE 60023626 T2 7/2006
EP 1090808 B1 11/2005

OTHER PUBLICATIONS

International Search Report dated Mar. 5, 2020, for corresponding PCT application No. PCT/US2019/061602, 2 pages.
(Continued)

*Primary Examiner* — John W Miller
*Assistant Examiner* — Mustafizur Rahman
(74) *Attorney, Agent, or Firm* — Price Heneveld LLP; Bradley D. Johnson

(57) ABSTRACT

A system for variable transmittance mirrors is disclosed wherein the variable transmittance mirrors may be controlled in response to images captured from a camera. The system may comprise a first imager, a first variable transmittance mirror, and a controller. The first imager comprises a pixel array. Further, the first imager is configured to capture image data. The first variable transmittance mirror has a first level of transmittance. Finally, the controller is configured to assign a first light intensity value to one or more pixels and change the first level of transmittance to a second level of transmittance based at least in part on the detected first light intensity. Such as system has the advantage of eliminating the need for a dedicated glare sensor, therefore reducing the number of devices, the costs, obstructions in a user's field of view, and a more aesthetically appealing appearance.

15 Claims, 5 Drawing Sheets

(51) Int. Cl.
*G02B 5/08* (2006.01)
*H04N 7/18* (2006.01)
*G08G 1/16* (2006.01)

(56) References Cited

U.S. PATENT DOCUMENTS

| | | | | |
|---|---|---|---|---|
| 6,111,683 A * | 8/2000 | Cammenga | ......... | B60Q 1/2665 340/468 |
| 6,111,684 A * | 8/2000 | Forgette | ............... | B60Q 1/2665 359/267 |
| 6,114,682 A * | 9/2000 | Minakuchi | .......... | G02B 26/123 250/205 |
| 6,124,647 A * | 9/2000 | Marcus | ............... | B60C 23/0401 307/10.1 |
| 6,172,613 B1 * | 1/2001 | DeLine | ................. | B60K 35/00 340/815.4 |
| 6,356,376 B1 * | 3/2002 | Tonar | ..................... | B60Q 1/2665 359/267 |
| 9,707,895 B2 * | 7/2017 | Uken | ...................... | B60R 1/088 |
| 10,046,706 B2 * | 8/2018 | Larson | ...................... | B60R 1/04 |
| 2002/0154379 A1 * | 10/2002 | Tonar | ...................... | F21S 45/47 359/267 |
| 2004/0108191 A1 * | 6/2004 | Su | ........................... | G01J 1/429 200/61.02 |
| 2004/0202001 A1 * | 10/2004 | Roberts | .................... | B60R 1/12 362/494 |
| 2005/0007645 A1 * | 1/2005 | Tonar | ..................... | G02F 1/157 359/265 |
| 2007/0182817 A1 * | 8/2007 | Briggance | ................ | B60R 1/00 348/118 |
| 2009/0195636 A1 * | 8/2009 | Arai | ..................... | G02B 26/124 347/243 |
| 2011/0058040 A1 | 3/2011 | Weller et al. | | |
| 2011/0115615 A1 * | 5/2011 | Luo | ....................... | H04N 13/239 340/436 |
| 2012/0056738 A1 * | 3/2012 | Lynam | ..................... | B60R 1/06 340/468 |
| 2012/0113424 A1 * | 5/2012 | Suda | .................... | G01N 21/554 356/370 |
| 2012/0162427 A1 * | 6/2012 | Lynam | ............... | H04N 5/23296 348/148 |
| 2012/0236388 A1 * | 9/2012 | De Wind | .................. | B60R 1/12 359/267 |
| 2013/0046441 A1 * | 2/2013 | Marczok | .............. | G05D 1/0212 701/41 |
| 2013/0293715 A1 | 11/2013 | Camilleri et al. | | |
| 2013/0314503 A1 * | 11/2013 | Nix | .................... | G06K 9/00805 348/46 |
| 2016/0096477 A1 * | 4/2016 | Biemer | .............. | G06K 9/00791 348/148 |
| 2016/0137133 A1 * | 5/2016 | VanderPloeg | ......... | B60R 1/1207 359/275 |
| 2017/0015248 A1 * | 1/2017 | Baur | ...................... | B60R 1/00 |
| 2017/0343792 A1 * | 11/2017 | Matsunobu | ........ | G02B 19/0047 |
| 2019/0150357 A1 * | 5/2019 | Wu | ........................ | A01C 21/00 |

OTHER PUBLICATIONS

Written Opinion of the International Search Authority dated Mar. 5, 2020, for corresponding PCT application No. PCT/US 2019/061602, 5 pages.

* cited by examiner

SYSTEM FOR REARVIEW CAMERA AS A GLARE SENSOR

CROSS-REFERENCE TO RELATED APPLICATION

This application claims priority under 35 U.S.C. § 119(e) to U.S. provisional Application No. 62/771,312 filed on Nov. 26, 2018, entitled "SYSTEM AND METHOD FOR REARVIEW CAMERA AS A GLARE SENSOR," the disclosure of which is hereby incorporated by reference in its entirety.

FIELD OF INVENTION

The present invention generally relates to light sensors and, more particularly, to light sensors used for rearview assemblies of vehicles.

BACKGROUND OF INVENTION

Variable transmittance mirrors have been well known for many years. Systems for variable transmittance rearview mirrors rely on a forward facing ambient light sensor and a rearward facing ambient light sensor positioned near the mirror—often referred to as a glare sensor. A controller accordingly determines a difference in intensity levels between the two ambient light sensors in order to estimate when a glaring light is present and accordingly vary the transmittance of the mirrors.

However, in systems comprising more than one variable transmittance rearview mirror, the system operates to vary the transmittance of all the mirrors together equally based on the single difference between the two ambient light sensors. Further, in some instances, glaring light may impact a user via each mirror by varying degrees as a result of the glaring light source's position. Thus, varying the transmittance of all mirrors equally may result in un-optimal degrees of transmittance for one or more mirrors.

Additionally, most vehicles are equipped with a back-up camera—which are well known in the art. Unlike the ambient light sensors of the variable transmittance mirror systems, which merely detect a light intensity, these cameras capture data via a pixel array to produce an image and often have lower dynamic ranges. Therefore, vehicles are equipped with yet an additional device.

Accordingly, there is a need for an improved variable transmittance mirror system whereby the total number of devices needed when paired with a back-up camera is reduced. Moreover, there is likewise a need for an improved variable transmittance mirror system whereby mirrors are varied in improved degrees with respect to glaring light sources of variable positions.

SUMMARY

In accordance with the present disclosure, the disadvantages and problems associated with variable transmittance mirror systems in the past have been substantially reduced or eliminated.

In accordance with one embodiment of the present disclosure, a system comprising a first imager, a first variable transmittance mirror, and a controller is disclosed. The first imager comprises a pixel array. Further, the first imager is configured to capture image data. The first variable transmittance mirror has a first level of transmittance. Finally, the controller is configured to assign a first light intensity value to one or more pixels and change the first level of transmittance to a second level of transmittance based at least in part on the detected first light intensity.

The advantages of certain embodiments of the present disclosure include of providing a rearview system wherein a dedicated glare sensor to detect light from rearward scene is not required, therefore reducing the total number of devices needed when paired with a backup camera. Accordingly, the overall costs of the system are reduced. Additionally, the elimination of a sensor potentially reduces the number of obstructions in a user's flied of view. Further, in instances where the dedicated glare sensor would otherwise be disposed on a variable transmittance mirror or a housing thereof, the elimination of this sensor provides for a cleaner and more aesthetically appealing appearance.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, it is to be understood that the specific devices and processes illustrated in the attached drawings and described in this disclosure are simply exemplary embodiments of the inventive concepts defined in the appended claims. Hence, specific dimensions and other physical characteristics relating the embodiments disclosed herein are not to be considered as limiting, unless the claims expressly state otherwise.

Figure 1:
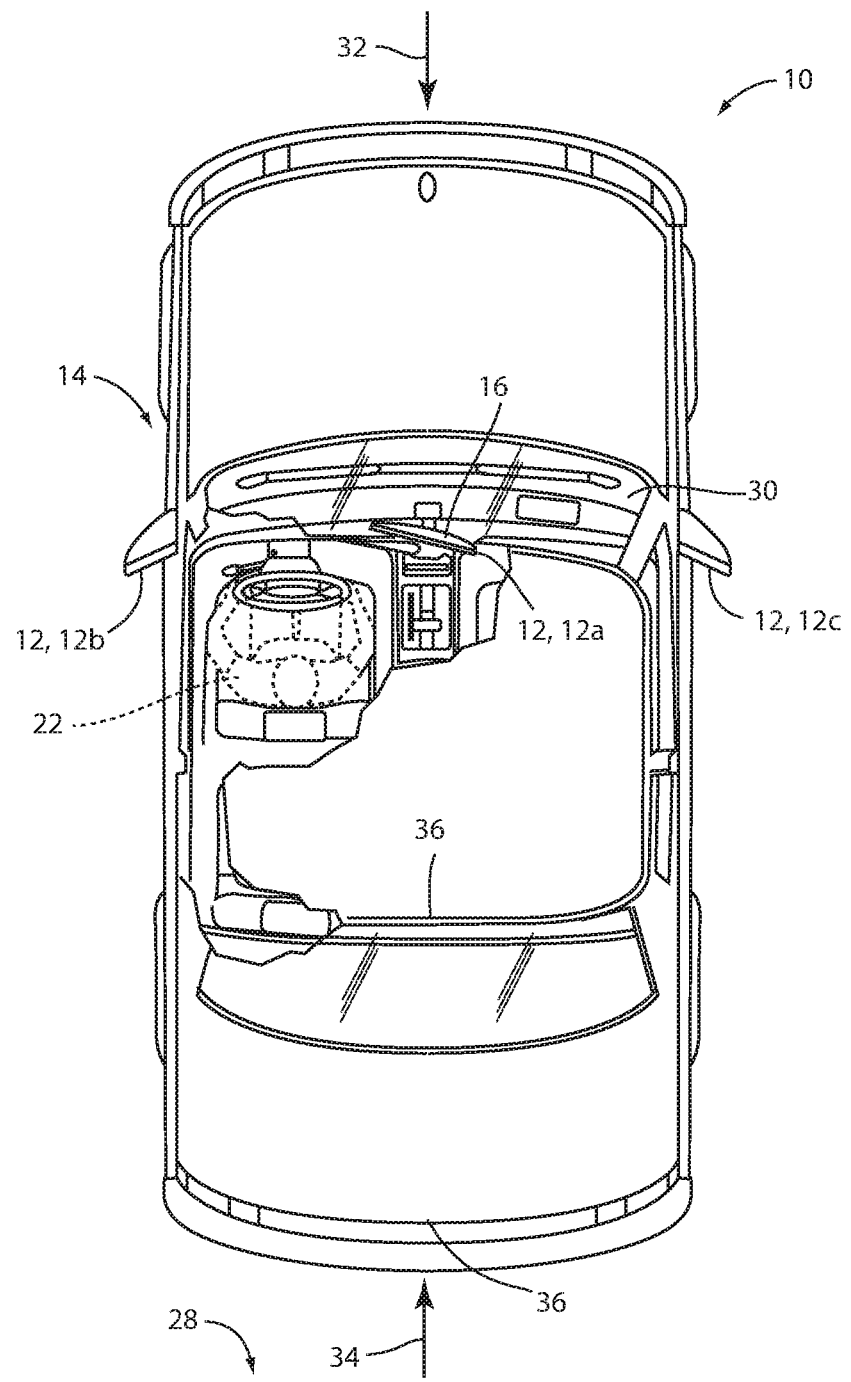
FIG. 1: Vehicle with rearview system.

FIG. 1 illustrates a vehicle 10 with a rearview system 14. Rearview system 14 comprises one or more variable transmittance mirror 12, a forward facing ambient light sensor 16, a rearview imager 36, and a controller 50 (not depicted in FIG. 1).

Variable transmittance mirror 12 may be any mirror operable to vary the degree to which light is transmitted. The transmittance of a mirror is the ratio of light reflected therefrom with respect to the light incident thereto. Accordingly, variable transmittance mirror 12 may be operable to dim. Further, variable transmittance mirror 12 may be operable to provide a user 22 a view of a rearward scene 28. Variable transmittance mirror 12 may be located interior or exterior vehicle 10. For example, variable transmittance mirror 12 may be an interior rearview mirror 12*a*, a driver side rear-view mirror 12*b*, or a passenger side rear-view mirror 12*c*.

Variable transmittance mirror 12 may be implemented using a variety of devices, such as those described in U.S. Pat. No. 3,680,951 entitled "PHOTOELECTRICALLY-CONTROLLED REAR-VIEW MIRROR" to Jordan et al., and U.S. Pat. No. 4,443,057 entitled "AUTOMATIC REAR- VIEW MIRROR FOR AUTOMOTIVE VEHICLES" to Bauer et al., each of which is incorporated herein by reference. Variable transmittance mirror 12 may be formed using liquid crystal cells as is described in U.S. Pat. No. 4,632,509 entitled "GLARE-SHIELDING TYPE REFLECTOR" to Ohmi et al., which is incorporated herein by reference. In an exemplary embodiment, variable transmittance mirror 12 may be implemented as an electrochromic cell which varies its transmittance in response to an applied control voltage, such as is described in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" to Byker, which is incorporated herein by reference. Though specific structures are disclosed for variable transmittance mirror 12, many other electrochromic devices may be used to implement variable transmittance mirror 12 without departing from the spirit of the disclosure.

Rearview imager 36 may be any device operable to capture image data, comprising a pixel array. Accordingly, rearview imager 36 is positioned and oriented such that it may capture image data corresponding to at least part of rearward scene 28. For example, rearview imager 36 may be located on a vehicle's 10 headliner, rear window, rear bumper, or trunk lid. The pixel array comprises a plurality of pixels in the form of light sensitive elements configured to measure light received through a lens or aperture. Each pixel of the pixel array may correspond to a photo-sensor, an array of photo sensors, or any grouping of sensors configured to capture light. Each of the photo-sensors may be operable to measure a value corresponding to a brightness or intensity of light. Rearview imager 36 may have a high dynamic range.

In some embodiments, rearview imager 36 may be in communication with an imager memory. The imager memory may be any device configured to store imager data. For example, the imager memory may store pixel data and/or exposure data corresponding to each pixel of the pixel array. The imager memory may comprise various forms of memory, for example, random access memory (RAM), dynamic RAM (DRAM), synchronous DRAM (SDRAM), and other forms of memory configured to store digital information. Each of the memory cells may correspond to an addressable memory location in the imager memory and have a capacity corresponding to the resolution of each pixel of the pixel array.

Examples of rearview imagers 36 configured to operate as high dynamic range image sensors are disclosed in U.S. Pat. No. 8,289,430 entitled "HIGH DYNAMIC RANGE IMAGING DEVICE," filed Dec. 6, 2007, by Jon H. Bechtel et al.; U.S. Pat. No. 8,305,471 entitled "HIGH DYNAMIC RANGE IMAGING DEVICE," filed Apr. 25, 2008, by Jon H. Bechtel et al.; U.S. Pat. No. 8,378,284 entitled "IMAGING DEVICE," filed Jan. 28, 2009, by Daniel Van Blerkom et al.; U.S. Pat. No. 8,144,223 entitled "IMAGING DEVICE," filed Jan. 28, 2009, by Daniel Van Blerkom et al.; U.S. Pat. No. 8,629,927 entitled "IMAGING DEVICE," filed Apr. 9, 2008 by Jon H. Bechtel et al.; U.S. Pat. No. 8,587,706 entitled "IMAGING DEVICE," filed Jun. 11, 2008, by Jon H. Bechtel; and U.S. Pat. No. 9,041,838 entitled "HIGH DYNAMIC RANGE IMAGER SYSTEM," filed Feb. 14, 2013, by Jon H. Bechtel, all of which are hereby incorporated herein by reference in their entirety.

Controller 50 may be any device operable to analyze image data from rearview imager 36 to determine the presence, intensity, or relative location of glare light 34. For example, controller 50 may be one or more processors, a multicore processor, or any combination of processors, circuits, and peripheral processing devices. Additionally, controller 50 may comprise a memory operable to store a pixel analysis algorithm. Further, controller 50 may be operable to adjust a reflectance, brightness, transmittance, or other display characteristic of one or more variable transmittance mirror 12. Accordingly, controller 50 is communicatively connected to one or more variable transmittance mirror 12 and rearview imager 36.

In some embodiments, rearview system 14 comprises a forward ambient light sensor 16. Forward ambient light sensor 16 may be any device operable to sense the intensity of ambient light in the direction it is oriented. Accordingly, forward ambient light sensor 16 is disposed such that it may detect forward ambient light 32 and is communicatively connected to controller 50. For example, forward ambient light sensor 16 may be located on a windshield 30, a headliner, or an interior rear-view mirror.

In some embodiments, rearview system 14 comprises a display. The display may be any digital screen, such as, a light emitting diode (LED) display, organic LED display, liquid crystal display (LCD), etc. The display may be communicatively connected to rearview imager 36 and operable to display a view of the exterior environment outside vehicle 10. For example, the display may be configured to display image data captured by rearview imager 36 to depict rearward scene 28 such that a user 22 may view rearward scene 28 in vehicle 10 without turning around.

In operation, rearview system 14 may be used by user 22 to view rearward scene 28 via one or more variable transmittance mirror 12. Further, while occupying vehicle 10, user 22 typically looks forward through windshield 30. Accordingly, the eyes of user 22 adjust to forward ambient light 32. However, a relatively bright light source—often the headlights of a second vehicle—in rearward scene 28 may produce glare light 34, which can reflect from a variable transmittance mirror 12, temporarily impairing or distracting user 22. Accordingly, to reduce the impact of glare light 34 on user 22, controller 50 may adjust or limit the transmittance of one or more variable transmittance mirror 22, based at least in part on the results of running the pixel analysis algorithm, where the pixel analysis algorithm analyzes image data from rearview imager 36. Controller's 50 analysis of the image data may be achieved in a variety of ways.

Upon completion of an exposure of a frame captured by rearview imager 36, controller 50 may utilize image data from the frame to determine the presence of glare light 34. The pixel analysis algorithm may be executed by controller 50 to analyze pixel data such that each pixel is given a scaled value representing the brightness or intensity of light to which it was exposed. For example, the pixel may be given a scaled value from a minimum (e.g. 0) to a maximum value (e.g. 10,000). In some embodiments, the scale may be of a linear relationship. Accordingly, the algorithm may identify a brightness of one or more pixels based on the scaled value. Pixels having scaled values above a glare threshold, or which are saturated (i.e. having maximum scaled values) may be used to identify glare light in rearward scene 28.

In response to the algorithm identifying one or more pixels having a scaled value above the glare threshold, controller 50 may vary the transmittance of one or more variable transmittance mirror 12, thereby limiting the reflection of glare light 34 by variable transmittance mirror 12. Further, the level of transmittance may be directly related to a scaled value of one or more pixel based on a look up table or formula.

In some embodiments, the algorithm may be configured to further distinguish among levels of saturation in order to effectively extend the dynamic range of rearview imager 36 without requiring the dynamic range to be adjusted or skewed from the that which may typically be supplied to display 52 for viewing the rearward scene 26, or a more expensive imager with increased dynamic range.

When saturated pixels are present, the algorithm may monitor a number, distribution, concentration, spacing, arrangement, grouping, and/or proportions of the saturated pixels. For example, once a number of pixels exceeding a first saturated pixel threshold are identified as saturated, the algorithm may identify that glare light 34 is present in rearward scene 28. In response, the algorithm may assign an increased scaled value (e.g. 11,000) to each of the saturated pixels. Additionally, if the number of saturated pixels exceed a second saturated pixel threshold, the algorithm may assign an increased scaled value (e.g. 12,000) to each of the pixels. Such a weighting may be applied by the algorithm in response to detecting the number of saturated pixels as exceeding a third threshold, a fourth threshold, etc.; each of which may result in the algorithm reassigning respectively increased values (e.g. 13,000; 14,000; etc.). In another example, the algorithm may be configured to identify a number of contiguous, adjacent, or clustered pixels that are saturated. Based on the number of pixels contiguous, adjacent, or clustered saturated pixels, the algorithm may increase the scaled values of the contiguous, adjacent, or clustered saturated pixels by scalar values or multipliers. In another example, the algorithm may extend the dynamic range of rearview imager 36 by replacing saturated pixel values with an increased scaled value in accordance with a predetermined glaring scaled value. Accordingly, luminance values of the pixels that are saturated may be increased into an extended ranged (e.g. 11,000; 12,000; . . . 19,000; 20,000).

Based on the scaled values associated with the extended value range of one or more pixels, or an average thereof, controller 50 may limit the transmittance of glare light 34 by controlling the transmittance of variable transmittance mirror 12—thus darkening it. Accordingly, controller 50 may utilize a rearview imager 36 with a dynamic range suited to capturing light for display on display 52, while detecting relative levels of glare light 34, which may be simulated or monitored by controller 50 based on the extended range.

In some embodiments, controller 50 may be configured to compare a scaled value, extended scaled value, average scaled value, or average extended scaled value of one or more pixels with a light intensity level determined by forward ambient light sensor 16. Accordingly, controller 50 may darken or limit the transmittance of variable transmittance mirror 12, based at least in part on a ratio achieved by the light values from rearview imager 36 and forward ambient light sensor 16. Therefore, controller 50 may ensure heightened scaled values are caused by glare light 34 opposed to bright ambient lighting conditions.

Controller 50 may be configured to distinguish one or more region of rearward scene 26. A region may correspond to one or more variable transmittance mirror 12—such as an interior rearview mirror 12a, a driver side rear-view mirror 12b, or a passenger side rear-view mirror 12c—operable to reflect light from said region. Alternatively, a region may correspond to an area outside the field of view of a variable transmittance mirror 12. Accordingly, controller 50 may independently control the transmittance of one or more variable transmittance mirror 12 with respect to when glare light 34 is not only detected, but likely present in variable transmittance mirror 12. Therefore, not only are individual variable transmittance mirrors 12 independently varied to optimal transmittance levels, but in instances where rearview imager 36 may capture light not within the field of view of variable transmittance mirror 12, the transmittance is not varied under a false determination of a need to reduce glare light 34.

In some embodiments, the algorithm may be configured to detect a movement of glare light 34. For example, controller 50 may detect a movement of a pixel saturation or high scaled value within the pixel array. Likewise, the algorithm may detect or infer a movement of glare light 34 as approaching vehicle 10 at a speed, based on a growth rate of the size of a saturated pixel group, a rate at which one or more pixels increase in detected light intensity, a rate at which the average scaled value of a group of pixels increases, or a reduction in time to pixel saturation. Optionally, to enable detection of a reduction in time to pixel saturation, during exposure of a frame, for one or more pixels, the imager memory may record an exposure time elapsed until saturation. Further, controller 50 may anticipate a glare light's 34 future position and control the transmittance of one or more variable transmittance mirror 12 in response to the anticipation.

For example, based on a movement of glare light 34 the algorithm may identify or infer that a second vehicle is passing vehicle 10, and optionally identify the side of vehicle 10 which the second vehicle will overtake on. Accordingly, controller 50 may delay adjusting the transmittance of one or more variable transmittance mirror 12 in anticipation of the second vehicle having moved outside of rearview imager's 36 field of view, but remaining within the variable transmittance mirror's 12 field of view for a duration thereafter. Further, in anticipation of the second vehicle overtaking on a specific side of vehicle 10, controller 50 may selectively delay changing the transmittance of one or more variable transmittance mirror 12 specifically corresponding to said side. For example, if glare light 34 is detected moving in a leftward direction, once glare light 34 has moved beyond the field of view of rearview imager 36, controller 50 may delay further adjusting the transmittance of a driver side rear-view mirror 12a for a duration. Accordingly, when a second vehicle providing glare light 34 passes vehicle 10, the variable transmittance mirror 12 does not undergo an increase in transmittance prior to the second vehicle substantially completes its pass-through variable transmittance mirror's 12 field of view. This is of particular significance where variable transmittance mirror 12 has a field of view substantially comprising an area not present in the field of view of rearview imager 36.

In some embodiments, the duration for which a change in transmittance is delayed by controller 50 in response to a detected movement of glare light 34 may be based at least in part on an inferred rate of speed or passing rate of the second vehicle. For example, the detected rate of motion of glare light 34 may be analyzed with the use of a look up table, equation, or other method to determine the duration of the change in transmittance delay. Glare light 34 with faster detected movements may correlate to shorter delays and vice versa.

The present disclosure has the technical advantage of providing a rearview system 14 wherein a dedicated glare sensor to detect light from rearward scene 28 is not required, therefore reducing the total number of devices needed when paired with a backup camera. Accordingly, the overall costs of the system are reduced. Additionally, the elimination of a sensor potentially reduces the number of obstructions in a user's 22 field of view. Further, in instances where the dedicated glare sensor is disposed on the variable transmittance mirror 12 or a housing thereof, the elimination of this sensor provides for a cleaner and more aesthetically appealing appearance.

Figure 2:
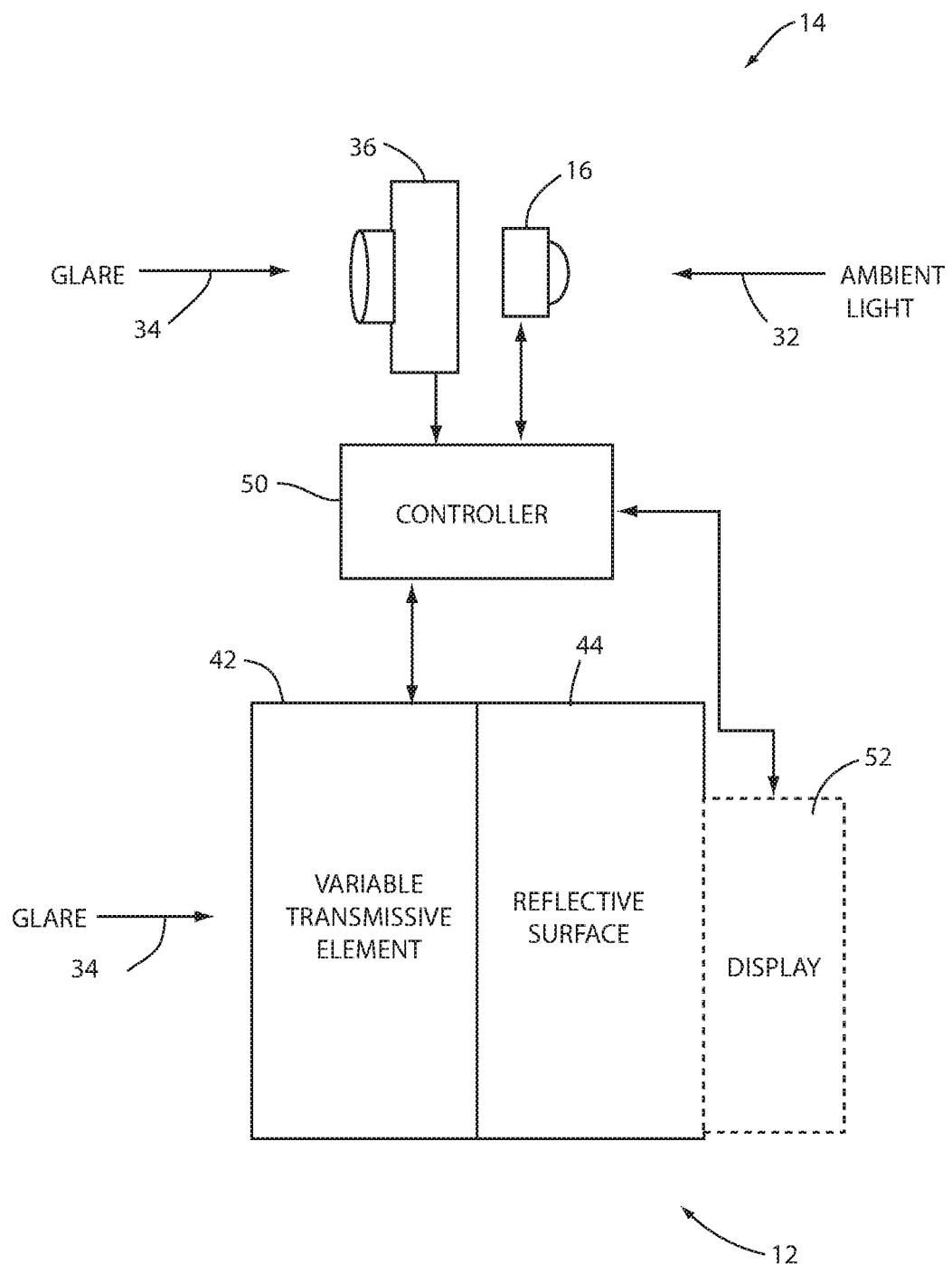
FIG. 2: Rearview system schematic.

FIG. 2 is a schematic representation of a rearview system 14. The rearview system comprises a variable transmittance mirror 12, a rearview imager 36, and a controller 50.

Variable transmittance mirror 12 comprises a variably transmissive element 42 and a reflective surface 44. The transmittance is the ratio of light reaching the variably transmissive element 42 to the light passing through variably transmissive element 42. Accordingly, variable transmittance mirror 12 is a mirror operable to dim. Further, variable transmittance mirror 12 is operable to provide a view of at least part of a rearward scene. For example, variable transmittance mirror 12 may be an interior rearview mirror, a driver side rear-view mirror, or a passenger side rear-view mirror.

Rearview imager 36 may be any device operable to capture image data, comprising a pixel array. Accordingly, rearview imager 36 is disposed such that it has a field of view comprising at least part of the rearward scene. The pixel array comprises a plurality of pixels in the form of light sensitive elements configured to measure light received through a lens or aperture. Each pixel of the pixel array may correspond to a photo-sensor, an array of photo sensors, or any grouping of sensors configured to capture light. Each of the photo-sensors may be operable to measure a value corresponding to a brightness or intensity of light. Rearview imager 36 may have a high dynamic range.

Controller 50 may be any device operable to analyze image data from rearview imager 36 to determine the presence, intensity, or relative location of glare light 34. For example, the controller may be one or more processors, a multicore processor, or any combination of processors, circuits, and peripheral processing devices. Additionally, the controller may comprise a memory operable to store a pixel analysis algorithm and image data relating to at least one frame taken by rearview imager 36. Further, the controller may be operable to adjust a reflectance, brightness, transmittance, or other display characteristic of one or more variable transmittance mirror 12. Accordingly, the controller is communicatively connected to variable transmittance mirror 12 and rearview imager 36.

In some embodiments, rearview system 14 may further comprise a forward ambient light sensor 16. Forward ambient light sensor 16 may be any device operable to sense the intensity of ambient light. Accordingly, forward ambient light sensor 16 is disposed such that it may detect ambient light 32 in generally opposite the direction of the rearward scene and is communicatively connected to controller 50.

In some embodiments, rearview system 14 may further comprise a display 52. Display 52 may be any digital screen, such as, a light emitting diode (LED) display, organic LED display, liquid crystal display (LCD), etc. Display 52 may be communicatively connected to rearview imager 36 and operable to display a view of the exterior environment outside vehicle 10. For example, display 52 may be configured to display image data captured by rearview imager 36 to depict rearward scene 28 such that a user may view the rearward scene. Optionally, display 52 may be disposed within variable transmittance mirror 12 such that variable transmittance mirror 12 is operable to switch between an electronic display mode and a traditional dimmable mirror mode, according to methods well known in the art.

In operation, rearview system 14 may be used by a user to view the rearward scene via variable transmittance mirror 12. Typically, a user's eyes are looking forward and accordingly adjust to forward ambient light 32 levels. However, a relatively bright light source—often the headlights of a vehicle—in the rearward scene may produce glare light 34, which can reflect off of reflective surface 44 and temporarily impair or distract the user. Accordingly, to reduce the impact of glare light 34 on a user, controller 50 may adjust or limit the transmittance of variable transmissive element 42, based at least in part on the results of running the pixel analysis algorithm. The pixel analysis algorithm analyzes image data from rearview imager 36. The algorithm's analysis of the image data may be achieved in a variety of ways.

Upon completion of an exposure of a frame captured by rearview imager 36, the algorithm may utilize image data from the frame to determine the presence of glare light 34. The algorithm may analyze pixel data such that each pixel is given a scaled value reflecting the brightness or intensity of light to which it was exposed. For example, the pixel may be given a scaled value from a minimum (e.g. 0) to a maximum value (e.g. 10,000). Optionally, the scale may be of a linear relationship. Accordingly, the controller may identify a brightness of one or more pixels based on the scaled value. Pixels having scaled values above a glare threshold, or which are saturated (i.e. having maximum scaled values), may be used to identify glare light in the rearward scene.

In response to the algorithm identifying one or more pixels having a scaled value above the glare threshold, controller 50 may vary the transmittance of variable transmittance mirror 12, thereby limiting the reflection of glare light 34 by variable transmittance mirror 12. Further, the level of transmittance may be directly related to a scaled value of one or more pixel based on a look up table or formula.

In some embodiments, the algorithm may be configured to further distinguish among levels of saturation in order to effectively extend the dynamic range of rearview imager 36 without requiring the dynamic range to be adjusted or skewed from the that which may typically be supplied to display 52 for viewing the rearward scene.

When saturated pixels are present, the algorithm may monitor a number, distribution, concentration, spacing, arrangement, grouping, and/or proportions of the saturated pixels. For example, once a number of pixels exceeding a first saturated pixel threshold are identified as saturated, the algorithm, may identify that glare light 34 is present in the rearward scene. In response, the algorithm may assign an increased scaled value (e.g. 11,000) to each of the saturated pixels. Additionally, if the number of saturated pixels exceed a second saturated pixel threshold, the algorithm may assign an increased scaled value (e.g. 12,000) to each of the pixels. Such a weighting may be applied by the algorithm in response to detecting the number of saturated pixels as exceeding a third threshold, a fourth threshold, etc.; each of which may result in the controller reassigning respectively increased values (e.g. 13,000; 14,000; etc.). In another example, the algorithm may be configured to identify a number of contiguous, adjacent, or clustered pixels that are saturated. Based on the number of contiguous, adjacent, or clustered saturated pixels, the algorithm may increase the scaled values of the pixels contiguous, adjacent, or clustered saturated pixels by scalar values or multipliers. In another example, the algorithm may extend the dynamic range of rearview imager 36 by simply replacing any saturated pixel value with an increased scaled value in accordance with a predetermined glaring scaled value. Accordingly, as illustrated by the preceding examples, luminance values of the pixels that are saturated may be increased into an extended ranged (e.g. 11,000; 12,000; . . . 19,000; 20,000).

Based on the scaled values associated with the extended value range of one or more pixels, or an average thereof, controller 50 may limit the transmittance of glare light 34 by adjusting the transmittance of variable transmittance mirror 12—thus darkening it. Accordingly, controller 50 may utilize a rearview imager 36 with a dynamic range suited to capturing light for display on display 52 and/or with a lower cost, while detecting relative levels of glare light 34 beyond its normal range.

In some embodiments, the algorithm, may be configured to compare a scaled value, extended scaled value, average scaled value, or average extended scaled value of one or more pixels to a light intensity level determined by forward ambient light sensor 16. Accordingly, controller 50 may darken or limit the transmittance of variable transmittance mirror 12, based at least in part on a ratio achieved by the light level values from rearview imager 36 and forward ambient light sensor 16. Therefore, controller 50 may ensure heightened scaled values are caused by glare light 34 opposed to ambient lighting conditions.

In some embodiments, controller 50 may be configured to distinguish one or more region of the rearward scene. A region may correspond to the field of view of variable transmittance mirror 12. Alternatively, a region may correspond to an area outside the field of view of variable transmittance mirror 12. Accordingly, controller 50 may adjust the transmittance of variable transmittance mirror 12 with respect to when glare light 34 is not only detected, but likely present in variable transmittance mirror 12. Therefore, in instances where rearview imager 36 may capture light not within the field of view of variable transmittance mirror 12, the transmittance is not varied under a false determination of a need to reduce glare light 34.

In some embodiments, the algorithm may be configured to detect a movement of glare light 34. For example, the algorithm may detect a movement of a pixel saturation or high scaled value within the pixel array. Likewise, the algorithm may detect or infer a movement of glare light 34 as approaching vehicle 10 at a speed, based on a growth rate of the size of a saturated pixel group, a rate at which one or more pixels increase in detected light intensity, a rate at which the average scaled value of a group of pixels increases, or a reduction in time to pixel saturation. Optionally, to enable detection of a reduction in time to pixel saturation, during exposure of a frame, for one or more pixels, the memory may record an exposure time elapsed until saturation. Further, the algorithm may anticipate a glare light's 34 future position and control the transmittance of one or more variable transmittance mirror 12 in response to the anticipation.

For example, based on a movement of glare light 34 the algorithm may identify or infer that a second vehicle is the first vehicle, and optionally identify whether the second vehicle will likely move into a region outside rearview imager's 36 field of view, but within variable transmittance mirror's 12 field of view. Accordingly, the controller may delay adjusting the transmittance of one or more variable transmittance mirror 12 in anticipation of the second vehicle having moved outside of rearview imager's 36 field of view but remaining within the variable transmittance mirror's 12 field of view for a duration thereafter. For example, if glare light 34 is detected moving in a leftward direction, once glare light 34 has moved beyond the field of view of rearview imager 36, the controller may delay further adjusting the transmittance of a variable transmittance mirror 12 on a driver side of a vehicle for a duration. Therefore, when a vehicle providing glare light 34 passes, the variable transmittance mirror 12 does not undergo an increase in transmittance prior to the vehicle substantially completing its pass-through variable transmittance mirror's 12 field of view. This is of particular significance where variable transmittance mirror 12 has a field of view substantially comprising an area not present in the field of view of rearview imager 36.

In some embodiments, the duration for which a change in transmittance is delayed by controller 50 in response to a detected movement of glare light 34 may be based at least in part on an inferred rate of speed or passing rate of the second vehicle. For example, the detected rate of motion of glare light 34 may be analyzed by the algorithm with the use of a look up table, equation, or other method to determine the duration of the change in transmittance delay. Glare light 34 with faster detected movements may correlate to shorter delays and vice versa.

The present disclosure has the technical advantage of providing a rearview system 14 wherein a dedicated glare sensor to detect light from rearward scene 28 is not required, therefore reducing the total number of devices needed when paired with a backup camera.

Figure 3:
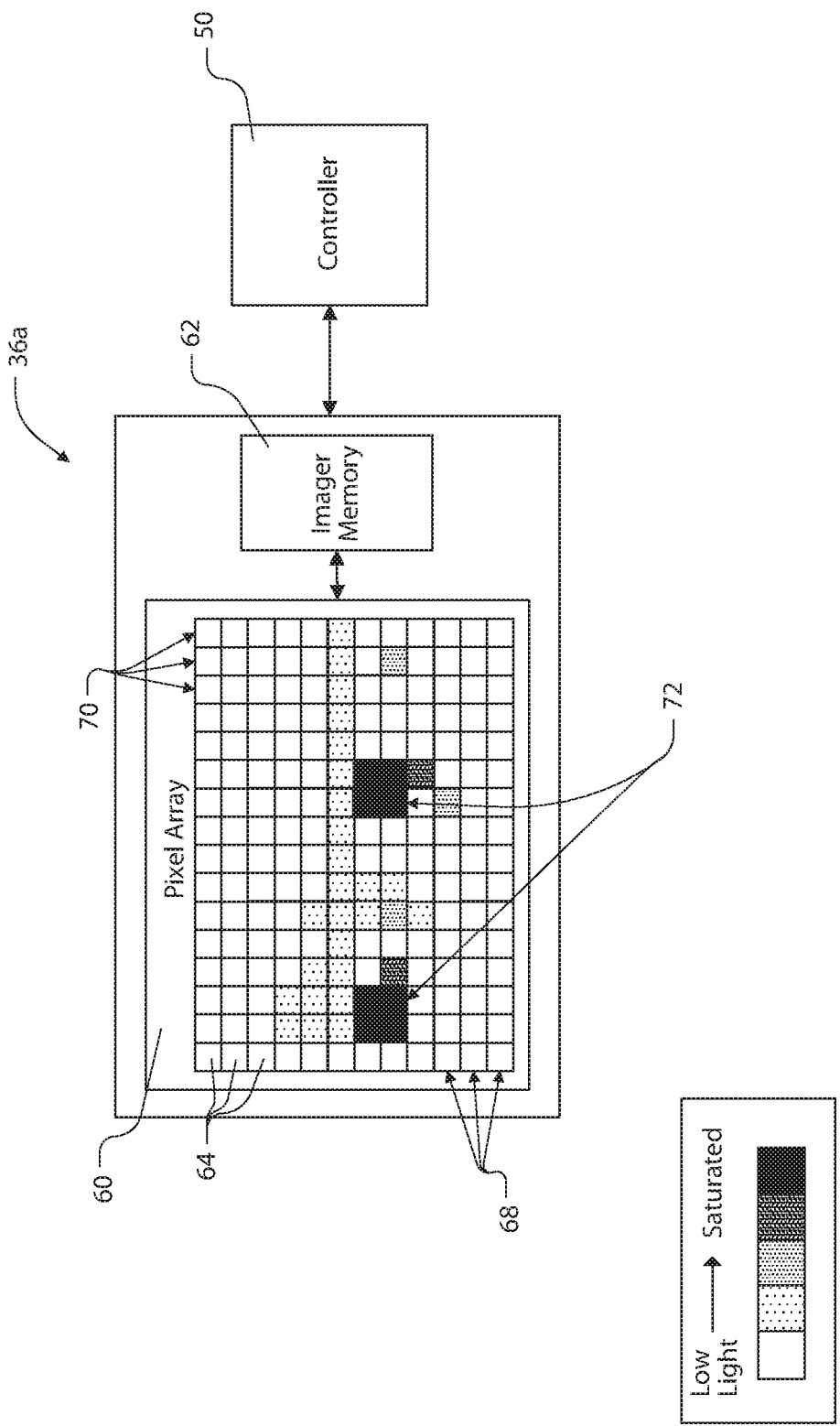
FIG. 3: Schematic diagram of aspects of a rearview system.

FIG. 3 is a schematic diagram of a rearview system. Rearview system comprises a rearview imager 36 and a controller 50. Rearview imager 36 comprises a pixel array 60. Pixel array 60 comprises a plurality of pixels 64 in the form of light sensitive elements configured to measure light that may be received though a lens or aperture. The pixel array 60 may be arranged in rows 68 and columns 70. Each pixel 64 of the pixel array 60 may correspond to a photo-sensor, an array of photo sensors, or any grouping of sensors configured to capture light. Each of the photo-sensors may be operable to measure a pixel value corresponding to a brightness or intensity of light.

In some embodiments, rearview imager 36 may be in communication with an imager memory 62. The imager memory may be configured to store imager data. For example, the imager memory may store pixel data and/or exposure data corresponding to each pixel of the pixel array. The imager memory may comprise various forms of memory, for example, random access memory (RAM), dynamic RAM (DRAM), synchronous DRAM (SDRAM), and other forms of memory configured to store digital information. Each of the memory cells may correspond to an addressable memory location in the imager memory and have a capacity corresponding to the resolution of each pixel of the pixel array.

Further, rearview imager 36 may be in communication with a controller 50. Controller 50 may be any device operable to analyze image data from rearview imager 36 to determine the presence, intensity, or relative location of glare light. For example, controller 50 may be one or more processors, a multicore processor, or any combination of processors, circuits, and peripheral processing devices. Additionally, controller 50 may comprise a memory operable to store a pixel analysis algorithm. Further, controller 50 may be operable to adjust a reflectance, brightness, transmittance, or other display characteristic of one or more variable transmittance mirror. Controller 50 may also be operable to receive and process ambient light data from an ambient light sensor.

Accordingly, glare light may be sensed and identified by a rearview system to adjust one or more variable transmittance mirror, based at least in part on the results of running the pixel analysis algorithm, according to the following method.

First, a frame is exposed by rearview imager 36 to generate image data. Second, the presence of glare light is determined by the algorithm utilizing the image data from the frame. The presence of glare light may be determined by the algorithm in accordance with a variety of methods. Third, controller 50 may vary the transmittance of the variable transmittance mirror, thereby limiting the possible reflection of glare light by the variable transmittance mirror. Controller 50 may vary the transmittance in a variety of manners responsive to the method the algorithm uses to determine the presence of glare light.

In some embodiments, the algorithm operates by assigning each pixel a scaled value reflecting the brightness or intensity of light to which it was exposed. For example, the pixel may be given a scaled value from a minimum (e.g. 0) to a maximum value (e.g. 10,000). Optionally, the scale may be of a linear relationship. Accordingly, the algorithm may next identify an intensity of glare light for one or more pixels based on the scaled value. Pixels 64 having scaled values above a glare threshold or which are saturated (i.e. having maximum scaled values) may be used to identify glare light in the rearward scene. Accordingly, the transmittance of the variable transmittance mirror may be varied by controller 50, thereby limiting the possible reflection of glare light by the variable transmittance mirror. Further, the level of transmittance may be directly related to a scaled value of one or more pixel based on a look up table or formula.

In some embodiments, levels of saturation are distinguished. The algorithm may distinguish among levels of saturation in order to effectively extend the dynamic range of rearview imager 36 without requiring the dynamic range to be adjusted or skewed from the that which may typically be supplied to a display for viewing the rearward scene or requiring a high dynamic range rearview imager 36 of greater cost.

When saturated pixels 72 are present, the algorithm may monitor a number, distribution, concentration, spacing, arrangement, grouping, and/or proportions of saturated pixels 72. For example, once a number of pixels 64 exceeding a first saturated pixel threshold are identified as saturated, the algorithm, may identify that glare light is present in the rearward scene. In response, the algorithm may assign an increased scaled value (e.g. 11,000) to each of the saturated pixels 72. Additionally, if the number of saturated pixels 72 exceed a second saturated pixel threshold, the algorithm may assign an increased scaled value (e.g. 12,000) to each of the saturated pixels 72. Such a weighting may be applied by the algorithm in response to detecting the number of saturated pixels 72 as exceeding a third threshold, a fourth threshold, etc.; each of which may result in the algorithm reassigning respectively increased values (e.g. 13,000; 14,000; etc.). In another example, the algorithm may be configured to identify a number of contiguous, adjacent, or clustered saturated pixels 72. Based on the number of contiguous, adjacent, or clustered saturated pixels 72, the algorithm may increase the scaled values of the contiguous, adjacent, or clustered saturated pixels 72 by scalar values or multipliers. In another example, the algorithm may extend the dynamic range of rearview imager 36 by simply replacing any saturated pixel value with an increased scaled value in accordance with a predetermined glaring scaled value. Accordingly, as illustrated by the preceding examples, scaled values of the pixels that are saturated may be increased into an extended ranged (e.g. 11,000; 12,000; . . . 19,000; 20,000).

Accordingly, based on the scaled values associated with the extended value range of one or more pixels 64, or an average thereof, controller 50 may limit a reflectance of glare light by the variable transmittance mirror by adjusting its transmittance—thus darkening it. Therefore, controller 50 may utilize a rearview imager 36 with a dynamic range suited to capturing light for display on a display and/or with a lower cost, while detecting relative levels of glare light 34 beyond its normal range.

In some embodiments, a scaled value, extended scaled value, average scaled value, or average extended scaled value of one or more pixels 64 may be compared by the algorithm with a light intensity level determined by an ambient light sensor. Accordingly, the transmittance of the variable transmittance mirror may be limited by controller 50, based at least in part on a ratio achieved by the light level values from rearview imager 36 and the ambient light sensor. Therefore, controller 50 may ensure heightened scaled values are due to glare light, opposed to ambient lighting conditions.

In some embodiments, one or more region of the rearward scene may be distinguished by controller 50. A region may correspond to the field of view of the variable transmittance mirror. Alternatively, a region may also correspond to an area outside the field of view of variable transmittance mirror. Accordingly, the transmittance of the variable transmittance mirror may be adjusted by controller 50 with respect to when glare light is not only detected, but likely present in the variable transmittance mirror. Therefore, instances where rearview imager 36 may capture light not within the field of view of the variable transmittance mirror, the transmittance is not varied under a false determination of a need to reduce glare light.

In some embodiments, movement of glare light may be detected by the algorithm. The movement of glare light may be detected by a variety of manners. For example, the algorithm may detect a movement of a pixel saturation or high scaled value within the pixel array 60. Likewise, the algorithm may detect or infer a movement of glare light as approaching at a speed, based on a growth rate of the size of a saturated pixel 72 group, a rate at which one or more pixels 64 increase in detected light intensity, a rate at which the average scaled value of a group of pixels 64 increases, or a reduction in time to pixel 64 saturation, over a successive series of frame. In some embodiments, detection of a reduction in time to pixel saturation, during exposure of a single frame, for one or more pixels 64, may occur by recording an exposure time elapsed until saturation by imager memory 62. Further, in some embodiments, the algorithm may anticipate a glare light's future position and control the transmittance of one or more variable transmittance mirror in response to the anticipation. For example, based on a movement of glare light, the algorithm may identify or infer that a second vehicle is passing a first vehicle and optionally identify whether the second vehicle will likely move into a region outside rearview imager's 36 field of view, but within the variable transmittance mirror's field of view.

Accordingly, the transmittance of the variable transmittance mirror may be varied by controller 50 where delays adjusting the transmittance of one or more variable transmittance mirror 12 in anticipation of the second vehicle having moved outside of rearview imager's 36 field of view but remaining within the variable transmittance mirror's field of view for a duration thereafter. For example, if glare light is detected moving in a leftward direction, once glare light 34 has moved beyond the field of view of rearview imager 36, controller 50 may delay further adjusting the transmittance of a variable transmittance mirror on a driver side of the first vehicle for a duration. Therefore, when a vehicle providing glare light passes, the variable transmittance mirror does not undergo an increase in transmittance prior to the vehicle substantially completing its pass-through the variable transmittance mirror's field of view. This is of particular significance where the variable transmittance mirror has a field of view substantially comprising an area not present in the field of view of rearview imager 36.

In some embodiments, the duration for which a change in transmittance is delayed by controller 50 in response to a detected movement of glare light 34 may be based at least in part on an inferred rate of speed or passing rate of the second vehicle. For example, the detected rate of motion of glare light may be analyzed by the algorithm with the use of a look up table, equation, or other method to determine the duration of the change in transmittance delay. Glare light with faster detected movements may correlate to shorter delays and vice versa.

The present disclosure has the technical advantage of providing a rearview system wherein a dedicated glare sensor to detect light from rearward scene is not required, therefore reducing the total number of devices needed when paired with a backup camera.

Figure 4:
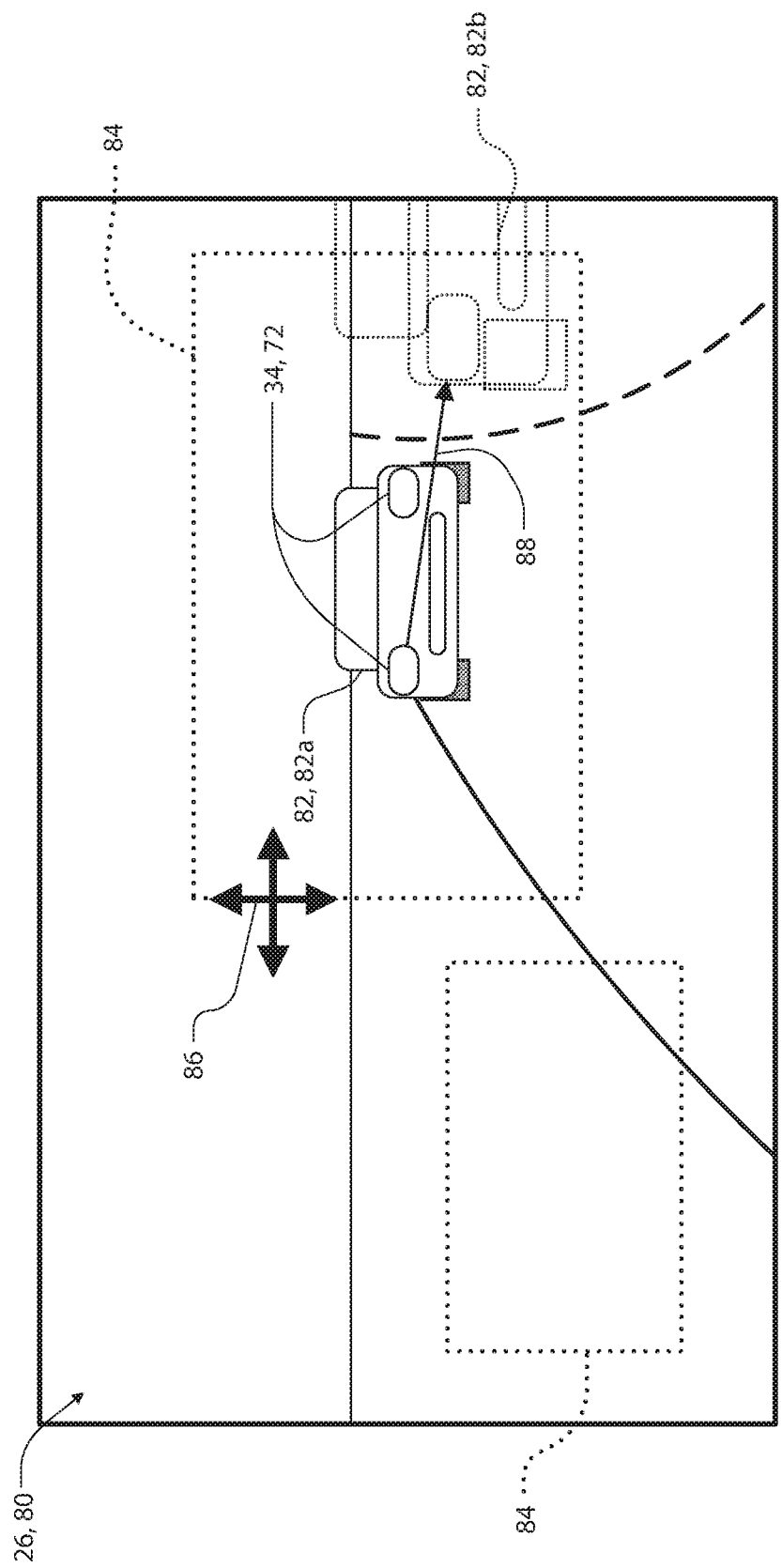
FIG. 4: Exemplary embodiment of image data captured by a rearview imager.

FIG. 4 is an exemplary embodiment of image data 80 captured by a rearview imager disposed on a first vehicle. Image data 80 corresponds to a rearview scene 26 as captured by the rearview imager. Rearview scene 26 contains a trailing vehicle 82. Trailing vehicle 82 is shown in a first position 82a and a second position 82b. As shown, trailing vehicle 82 is represented as being closer to the first vehicle in second position 82b relative to the first position 82a. Trailing vehicle 82 may have headlights 72 which may be a source of glare light 34.

Image data 80 may be analyzed by a pixel analysis algorithm stored in a controller communicatively linked to the rearview imager. The algorithm may be operable to identify glare light 34 based on image data 80.

In some embodiments, the algorithm may be operable to differentiate between and identify glare light 34 in one or more region of interest 84. The region of interest 84 may correspond to a field of view of one or more variable transmittance mirror. Accordingly, the controller may adjust the transmittance of a variable transmittance mirror based on the detection of glare light specifically within the variable transmittance mirror's field of view, opposed to simply in rearward scene. Additionally, in some embodiments, the controller may be configured to selectively process the one or more regions of interest 84 based on a focal length, field of view, mounting position, and/or various properties of the rearview imager. Accordingly, selective processing reduces data analysis times by limiting analysis to relevant areas of the rearview imager's field of view.

Additionally, the algorithm may vary a location 86 of one or more of the regions of interest 84 based on input signals that may indicate a steering direction or navigation direction of the first vehicle. For example, in some embodiments, the controller may be in communication with a steering angle sensor, inertial sensor, gyroscope, navigation system, and/or various directional detection devices of the fist vehicle. Accordingly, the algorithm may move the region of interest 84 in anticipation of changing relative positions of the first and trailing vehicles.

Additionally, the algorithm may be configured to selectively process one or more objects (e.g. a vanishing point, lane line, horizon, etc.) and dynamically position the region of interest 84 to assist in the identification of glare light 34. In this way, the controller may further be operable to detect a location or relative intensity of glare light 34 to control the transmittance of a variable transmittance mirror, based on an anticipated change in a field of view of the variable transmittance mirror. Further, the algorithm may be configured to detect a movement 88 of the glare light 34 from a first position 82a to a second position 82b.

Figure 5:
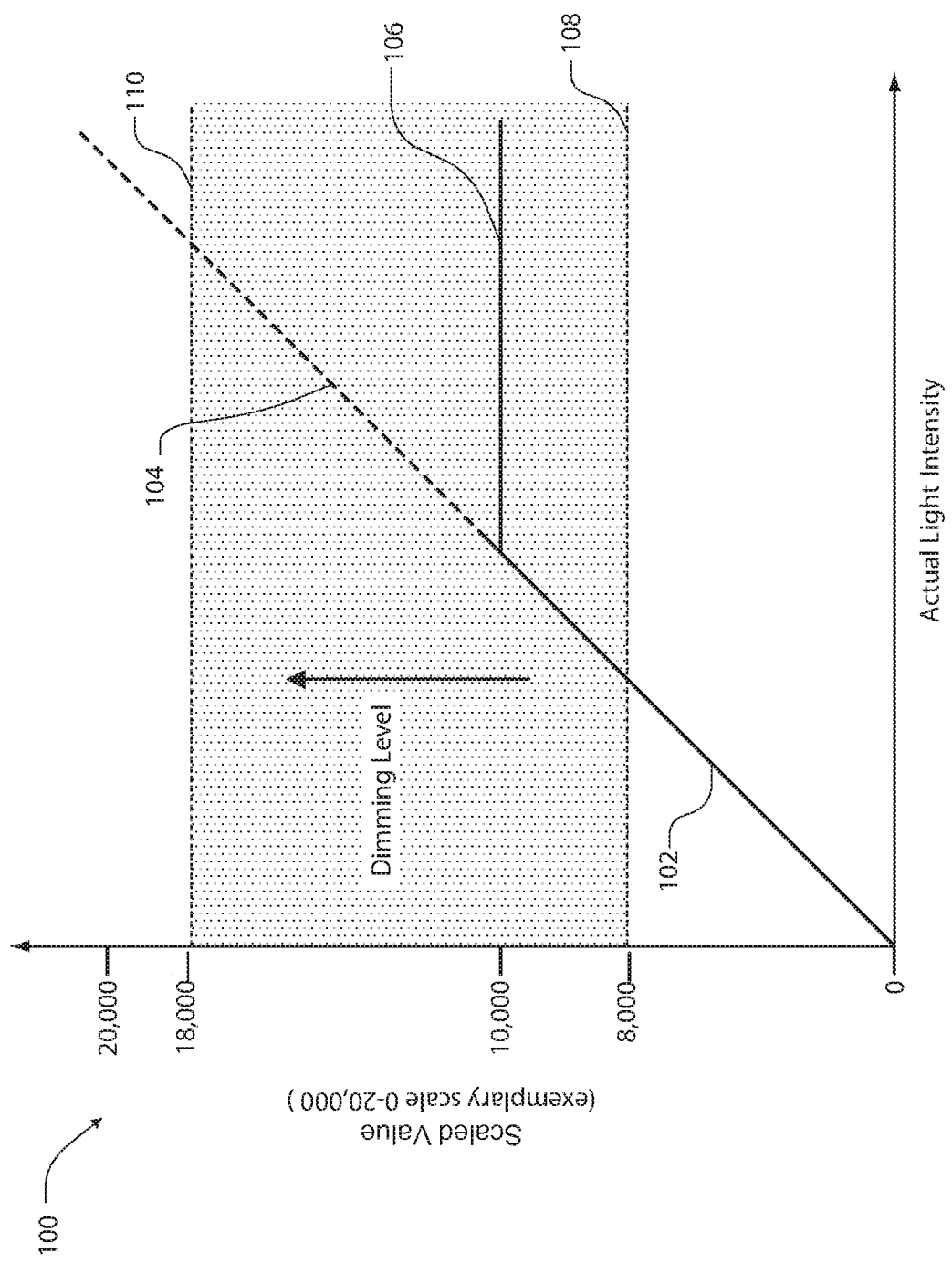
FIG. 5: Exemplary demining routine plot for a variable transmittance mirror.

FIG. 5 illustrates an exemplary dimming routine plot 100 for a variable transmittance mirror. Dimming routine plot 100 plots scaled values as a function of actual light intensity. Scaled values are numbers assigned to a pixel to representing the brightness or intensity of light to which the pixel is exposed.

A rearview imager may be operable to capture image data corresponding to a rearward scene via a pixel array. The image data may be analyzed by an algorithm run by a controller. The algorithm may measure light of the pixels by determining and/or adjusting a scaled value for one or more pixel. As shown, the intensity of the light may be determined by the controller within a range of 0 to 20,000. However, the rearview imager may have a dynamic range 102 with an upper limit lower than 20,000. Accordingly, the controller may supplement the range with an extended dynamic range 104 calculated by the algorithm.

For example, the saturation of a pixel may occur at a saturation threshold 106 corresponding to a scaled value of 10,000. Accordingly, when exposed to light having a greater intensity than the saturation threshold 106, pixels will be saturated and data beyond the saturation threshold as to the intensity of the light lost. However, the algorithm may be configured to further distinguish among levels of saturation in order to effectively extend the dynamic range of rearview imager 36 without requiring the dynamic range to be adjusted or skewed.

In response to identifying saturated pixels, the algorithm may assign an increased scaled value (e.g. 11,000) to each of the saturated pixels. Additionally, if the number of saturated pixels exceed a second saturated pixel threshold, the algorithm may assign an increased scaled value (e.g. 12,000) to each of the pixels. Such a weighting may be applied by the algorithm in response to detecting the number of saturated pixels as exceeding a third threshold, a fourth threshold, etc.; each of which may result in the controller reassigning respectively increased values (e.g. 13,000; 14,000; etc.). In another example, the algorithm may be configured to identify a number of contiguous, adjacent, or clustered pixels that are saturated. Based on the number of pixels contiguous, adjacent, or clustered saturated pixels, the algorithm may increase the scaled values of the pixels contiguous, adjacent, or clustered saturated pixels by scalar values or multipliers. In another example, the algorithm may extend the dynamic range of rearview imager by simply replacing any saturated pixel value with an increased scaled value in accordance with a predetermined glaring scaled value. Accordingly, as illustrated by the preceding examples, luminance values of the pixels that are saturated may be increased into an extended ranged (e.g. 11,000; 12,000; . . . 19,000; 20,000).

Further, based on the scaled values associated with the extended value range of one or more pixels, or an average thereof, the controller may limit a variable transmittance mirror's transmittance of glare light by adjusting the transmittance of the variable transmittance mirror—thus darkening it. Further, the degree to which the transmittance may be adjusted (i.e. the dimming level) may be directly related to one or more scaled value. Accordingly, the controller may utilize a rearview imager with a dynamic range suited to capturing light for display on display and/or with a lower cost, while detecting relative levels of glare light beyond its normal range.

For example, the controller may adjust the transmittance of a variable transmittance mirror when the scaled value is in a range of 8,000 (lower dimming threshold 108) to 18,000 (upper dimming threshold 110). Further, the dimming level of the variable transmittance mirror may increase with increasing scaled values up to and beyond the saturation threshold 106.

In this document, relational terms, such as "first," "second," "third," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:
a first imager comprising a pixel array, the imager configured to capture image data;
a first variable transmittance mirror having a first level of transmittance; and
a second variable transmittance mirror, having a third level of transmittance;
a controller configured to:
assign a first light intensity value to one or more pixels of the pixel array,
determine whether the first light intensity is present in a first region of the pixel array, and
change the first level of transmittance to a second level of transmittance and the third level of transmittance to a fourth level of transmittance based, at least in part, on:
the detected first light intensity, and
a determination of the presence of the first light intensity in the first region.

2. The system of claim 1, wherein:
the controller is further configured to:
not change the first level of transmittance and the third level of transmittance based, at least in part, on:
the detected first light intensity, and
a determination that the presence of the first light intensity is not in the first region.

3. The system of claim 1, wherein the second and fourth levels of transmittance are different.

4. The system of claim 1, wherein the second and fourth levels of transmittance are the same.

5. The system of claim 1, further comprising:
a third variable transmittance mirror, having a fifth level of transmittance;
wherein the controller is further configured to change the fifth level of transmittance to a sixth level of transmittance based, at least in part, on:
the detected first light intensity, and
the determination of the presence of the first light intensity in the first region.

6. The system of claim 5, wherein the second, fourth, and sixth levels of transmittance are different.

7. A system comprising:
a first imager comprising a pixel array, the imager configured to capture image data;
a first variable transmittance mirror having a first level of transmittance; and
a second variable transmittance mirror, having a third level of transmittance;
a controller configured to:
a controller configured to:
assign a first light intensity value to one or more pixels of the pixel array, and
determine whether the first light intensity is present in a first region of the pixel array,
determine whether the first light intensity is present in a second region of the pixel array,
change the first level of transmittance to a second level of transmittance based, at least in part, on:
the detected first light intensity, and
a determination that the presence of the first light intensity is in the first region, and
not change the third level of transmittance based, at least in part, on:
the detected first light intensity, and
a determination that the presence of the first light intensity is not in the second region.

8. A system comprising:
a first imager comprising a pixel array, the imager configured to capture image data;
a first variable transmittance mirror having a first level of transmittance; and
a controller configured to:
assign a first light intensity value to one or more pixels of the pixel array,
determine a location of the first light intensity within the pixel array,
determine a change in at least one of the location of the first light intensity, and
change the first level of transmittance to a second level of transmittance based, at least in part, on the change in the location of the first light intensity.

9. The system of claim 8, further comprising:

a second variable transmittance mirror having a third level of transmittance;

wherein:

the controller is further configured to change the third level of transmittance to a fourth level of transmittance based, at least in part, on the change in the location of the first light intensity, and the second and fourth levels of transmittance are different.

10. A system comprising:

a first imager comprising a pixel array, the imager configured to capture image data;

an ambient light sensor operable to detect a second light intensity value;

a first variable transmittance mirror having a first level of transmittance;

a second variable transmittance mirror having a third level of transmittance; and a controller configured to:

assign a first light intensity value to one or more pixels of the pixel array, assign a third light intensity value to at least one pixel of the pixel array, compare the second light intensity value to the first light intensity value and the third light intensity value:

change the first level of transmittance to a second level of transmittance based, at least in part, on the comparison of the first and second light intensity values, and change the third level of transmittance to a fourth level of transmittance based, at least in part, on the comparison of the second and third light intensity values.

11. A system comprising:

a first imager comprising a pixel array, the imager configured to capture image data;

a first variable transmittance mirror having a first level of transmittance; and a controller configured to:

assign a first light intensity value to one or more pixels of the pixel array, detect a saturation of the one or more pixels, and increase the assigned first light intensity value of the one or more saturated pixels based, at least in part, on the detection of the saturation of the one or more pixels, and change the first level of transmittance to a second level of transmittance based, at least in part, on the increased first light intensity value.

12. The system of claim 11, wherein the assigned first light intensity value is increased in proportion to the number of saturated pixels detected.

13. The of claim 11, wherein the controller is further configured to change the first level of transmittance to a second level of transmittance based further, at least in part, on the increased first light intensity value.

14. The system of claim 11, further comprising:

an ambient light sensor operable to detect a second light intensity;

wherein the controller is further operable to:

compare the first increased light intensity and the second light intensity, and change the first level of transmittance to a second level of transmittance based further, at least in part, on the comparison of the first increased light intensity and the second light intensity.

15. The system of claim 14, further comprising:

a second variable transmittance mirror having a third level of transmittance;

wherein the controller is further configured to:

detect a third light intensity corresponding to at least one pixel of the pixel array, detect a saturation of the at least one pixel, increase the assigned third light intensity value of the at least one pixel based, at least in part, on the detection of the saturation of the at least one pixel, compare the increased third light intensity with the second light intensity, and change the third level of transmittance to a fourth level of transmittance based, at least in part, on the comparison of the increased third light intensity with the second light intensity.

* * * * *